Patented Jan. 5, 1943

2,307,157

UNITED STATES PATENT OFFICE 2,307,157

STABILIZED VINYL RESIN

William M. Quattlebaum, Jr., and Charles A. Noffsinger, Charleston, W. Va., assignors to Carbide and Carbon Chemicals Corporation, a corporation of New York No Drawing. Application July 1, 1942, Serial No. 449,322

11 Claims. (Cl. 260—86)

Vinyl resins containing combined halogen have attained wide recognition in the field of plastics and coating compositions. Usually the halogen is combined in the resin solely by reason of the fact that a halogen-containing vinyl compound or halogen-containing vinyl derivative, such as vinyl chloride, vinyl chloracetate, vinylidene chloride, chlorstyrene or chlorbutadiene is included in the polymerization reaction giving rise to the vinyl resin. However, in other instances, halogen is introduced into the formed vinyl resin, irrespective of whether this resin is derived from a non-halogen containing vinyl compound or derivative, such as vinyl acetate, styrene or ethylene, or a halogen-containing vinyl compound or vinyl derivative. This latter operation may be carried out by suitable after-chlorination of the resins in the presence of a softening agent for them. Of the class of halogen-containing vinyl resins, the resins which include a vinyl halide in their constitution are probably most widely known, particularly the resins such as are formed by the conjoint polymerization of vinyl chloride with vinyl esters of aliphatic acids or with other unsaturated polymerizable compounds.

These materials have the somewhat undesirable property of tending to decompose when heated to the extent which is frequently required in their formation and fabrication into various products. Even though this decomposition may not materially detract from most of the qualities of the resins, it is accompanied by and evidenced as the development of color in the resin. For instance, an initially clear and colorless vinyl resin resulting from the conjoint polymerization of vinyl chloride with vinyl acetate will, on heating, become faintly yellow at first; then on continued heating, the yellow color deepens and the resin color passes through the various shades of tan to brown, and, finally, to black and the resin chars when the ultimate limit of decomposition is approached. Usually, only the initial stages of color development need be considered, but these are sufficient to restrict certain uses of the resin regardless of the absence of real effect of this minor decomposition on other properties of the material.

This characteristic of these vinyl resins has naturally received much attention, and many stabilizing substances have been proposed as means of preventing or retarding the heat decomposition of vinyl resins containing combined halogen. As a result, there can be added to or incorporated with the resins a number of stabilizing substances which are quite efficacious in decreasing the tendency of these materials to become colored (decomposed) when heated. Because it is believed that much of the effect of heat on these vinyl resins is due to the liberation of hydrogen halide in the polymer, which catalyzes further decomposition if allowed to remain, the stabilizing substances have frequently been either basic substances to neutralize this acid or substances which combine readily with hydrogen halides to form relatively inert compounds.

The basic substances which have been used to stabilize halogen-containing vinyl resins have included both inorganic and organic bases as described in Young and Douglas Patent No. 2,013,941. The more useful of the inorganic bases include lead and calcium salts of the higher fatty acids, such as lead oleate, lead stearate, calcium oleate and calcium stearates, which are the subject of Reed and Groff Patent No. 2,075,543, as well as the lead and cadmium salts of the lower fatty acids, such as the acetates, which have been fused with alkali metal salts of these acids, as set forth in Young and Quattlebaum Patent No. 2,261,611. Other basic lead compounds, such as litharge and basic lead sulfite, are widely used as stabilizers in coating compositions, and the use of such compounds for this purpose is the particular subject of Doolittle Patents Nos. 2,141,126 and 2,161,024. Alcoholates of the alkaline earth metals also have useful stabilizing action, and are described in Quattlebaum Patent No. 2,256,625. The organic bases have included amido and amino compounds, such as urea and triethanolamine, and various groups of basic heterocyclic compounds, such as compounds of the pyridine, quinoline, and isoquinoline types and of the pyrazine and pyrazole types. It has also been proposed to employ resins which contain basic amino groups as stabilizers for halogen-containing vinyl resins.

While basic substances as a class will inhibit serious discoloration and decomposition of halogen-containing vinyl resins, and while many of the above compounds have especial merit for this purpose, it has been observed that such compositions develop yellow or other colors on slight heating thereof, even though blackening of the resin may be retarded for a considerable period. This condition has been very much minimized by the recent introduction, as stabilizers for halogen-containing vinyl resins, of organo-metallic lead and tin compounds, such as the tetra-aryl and tetra-alkyl tin derivatives described in Yngve Patents Nos. 2,219,463 and 2,267,779, the organo-metallic lead and tin oxides and hydroxides claimed in Yngve Patent No. 2,267,777, and organo-metallic tin salts of carboxylic acids as set forth in Yngve application, Serial No. 365,008, filed November 9, 1940. However, even when these compounds were included, compositions approaching optical glass in clarity could not be obtained, a very slight haze or yellow cast being discernible in sheets heat pressed from the resin, which rendered them not wholly satisfactory for certain uses where a high degree of clarity and freedom from color were necessary, as in window panes, slide covers for microscopes, turrets and gun enclosures for aircraft, and shatter-resistant dial covers for gauges, meters and other instruments.

The object of this invention is to provide an effective means for preventing discoloration in halogen-containing vinyl resins when they are subjected to heat, either intensely as in processing operations, or less severely over a prolonged period, as in boiler rooms and warm climates. This object is achieved by providing a new class of stabilizers which may be used with halogen-containing vinyl resins. The new stabilizers may be used alone or may be combined with basic substances of the type described above.

The stabilizers of this invention consist of the organo-metallic tin salts of alpha, beta-olefinic unsaturated carboxylic acids. Both aliphatic and aromatic acids within this class are included within the scope of the invention. Tests have established that the conjugated group,

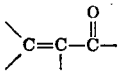

of the new stabilizers exerts a decided influence on their stabilizing properties. It is believed that this group may reduce color in the resins by reaction with chromophoric groups formed by decomposition. However, it is possible that some other mechanism may account for the observed results. According to one view, basic substances which are added to the resins to prevent serious decomposition thereof may themselves cause chromophoric groups to be developed in the resins after intense heating. For instance, a vinyl resin resulting from the conjoint polymerization of vinyl chloride with vinyl acetate which has been combined with 2% of dibutyl tin dilaurate, a stabilizer highly recommended not only for reducing the tendency of resins of this class to decompose on exposure to heat but for inhibiting yellowing under ordinary circumstances, will develop a yellow color on very intense heating at 150° C. A sample of resin which had become discolored when subjected to this treatment was mixed with 1% by weight of maleic anhydride on a differential roll mill. The sample was thereafter heated at 150° C. for an additional five minutes. At the end of this time, it had lost much of its yellow color.

In another instance, an unstabilized solution of the same resin in dibutyl sebacate was heated for a considerable period of time until it developed a yellow color. Approximately 1% of maleic anhydride (based on the weight of the resin) was added to the solution and it was then further heated. A marked reduction in yellow color became apparent.

While the above experiments illustrate the ability of compounds containing the conjugated group,

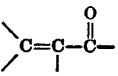

to neutralize the color which is developed in halogen-containing resins on heating, the invention involves the addition of an organo-metallic tin salt of an alpha, beta-olefinic unsaturated carboxylic acid to a halogen-containing resin in order to stabilize the resin and to inhibit the development of color. As contrasted with the free acids mentioned above, these compounds have the advantages of being completely compatible with the halogen-containing vinyl resins, of being permanently retained therein, and of being substantially without effect on the water resistance and other desirable properties of the resins. In addition, they are capable of neutralizing hydrogen halides released in the resins on heating, and they exhibit the characteristic property of color inhibition because of the conjugated group which they contain.

The new compounds may advantageously be included along with another basic substance, representative types of which are known in the art as mentioned above, wherein the basic substance will combine with any hydrogen chloride released in the resin and the organo-metallic tin salt of the alpha, beta-olefinic carboxylic acid will inhibit color development in the resin. This procedure has the advantage that only small quantities of the tin compound relative to the other basic material need be employed. Examples of alpha, beta-olefinic carboxylic acids which may be employed in making the organo-metallic tin derivatives include the following acids: maleic, itaconic, fumaric, citraconic, aconitic, crotonic, acrylic, methacrylic, phenyl-acrylic (cinnamic acid), α-ethyl acrylic, α-methyl crotonic, propylideneacetic (α, β-pentenic acid), β, β-dimethylacrylic, β-isopropylacrylic, ethyl crotonic, sorbic, β-vinyl acrylic, ethylidene succinic, diphenyl maleic, dibenzyl maleic, monophenyl maleic, α, α-dimethyl itaconic, ethyl maleic, isopropyl maleic, dimethyl maleic, glutaconic, β-methyl glutaconic, α, α-dimethyl glutaconic, muconic, and dimethylene succinic acids.

The organo-metallic tin salts of the alpha, beta-olefinic carboxylic acids may be made by fusing an organo-metallic tin oxide or hydroxide with the desired carboxylic acid. Such stabilizers are an improvement over the known organo-metallic tin salts of carboxylic acids in that they impart additional resistance to the development of color in the resins. Any organic radical may comprise the organo group attached to the tin atom of the organ-metallic tin salt, and there may be one, two, or three such radicals attached to the tin atom. These radicals may also be different from one another. In many instances, the organo group of the organo-metallic tin salt may be a hydrocarbon radical, and any of the various hydrocarbon radicals may be employed. The alkyl groups include the propyl, isopropyl, butyl, isobutyl, teritary butyl, the various amyl, hexyl, and octyl groups, and the like. Of the aryl and mixed aryl-alkyl derivatives, those having phenyl, tolyl, xylyl, benzyl or naphthyl groups are typical of suitable compounds. The organo group of the organo-metallic tin salts is not limited to alkyl, aralkyl, aryl or alkaryl radicals, and substituted alkyl, aralkyl, aryl and alkaryl radicals may be employed. An extensive group of substitutents may be employed in these radicals in order to provide increased compatibility of the tin derivative with the various types of halogen-containing vinyl resins to be stabilized. In many instances ester, carboxyl, keto-, chloro-, and ether groups may be effective. Representative of specific compounds within the broader classification are the following:

- Dibutyl tin maleate
- Di(tributyl tin) maleate
- Dibutyl tin dicrotonate
- Dibutyl tin fumarate
- Tri(dibutyl tin) diaconitate
- Dibutyl tin di(monoheptadecyl maleate)

The following examples will serve to illustrate the invention:

*Example 1*

A conjoint polymer of vinyl chloride with vinyl acetate containing about 87% vinyl chloride was intimately combined with 1% of dibutyl tin fumarate by working the resin and stabilizer on a heated roll mill. The composition thus produced was clear and colorless, and it did not discolor on heating for 135 minutes at 135° C.

*Example 2*

A conjoint polymer of vinyl chloride with vinyl acetate was intimately combined with 1% of tri-(dibutyl tin) diaconitate by working the resin and stabilizer on a heated roll mill. The composition thus produced was clear and colorless, and it did not discolor on heating for 135 minutes at 135° C.

*Example 3*

Two samples of the same vinyl resin as described in Example 1 were prepared by milling into them 1% by weight of dibutyl tin maleate in the case of one and 2% by weight of triphenyl tin stearate in the case of the other. Each sample as prepared was substantially colorless. Small plaques were then molded from these resin samples at 150° C. with a heating period of fifteen minutes. After molding, the sample, in accordance with this invention, which contained the dibutyl tin maleate, remained almost colorless, whereas the second sample containing triphenyl tin stearate was somewhat yellow in color.

*Example 4*

A sample of the same resin as described in Example 1 was intimately mixed with 2% by weight of dibutyl tin dicrotonate on a differential roll mill at 110° C. The milled sheet was then submitted to heat treatment in an oven at 135° C. The color of the sheet remained light for several hours, the color stability being almost as good as that of a similarly treated sheet containing 2% by weight of dibutyl tin maleate.

*Example 5*

Di-(tributyl tin) maleate was made by the reaction of the theoretical quantities of maleic anhydride and tributyl tin hydroxide at 170° C. When 2% by weight of this compound was milled into a conjoint polymer of vinyl chloride and vinyl acetate, and then heated in a mold for fifteen minutes at 150° C., a transparent and practically colorless disc was obtained. Triphenyl tin stearate, tributyl tin laurate, and tributyl tin oleate (which contains an unsaturated group not conjugated with oxygen) when combined in the resin yielded discs having a yellow cast when molded under similar conditions.

*Example 6*

Tests were conducted to establish the fact that the unsaturated conjugated system in dibutyl tin maleate is responsible for the decolorizing effect by comparing the action of this compound with dibutyl tin succinate, the analogous saturated compound. In these tests identical samples of resin resulting from the conjoint polymerization of vinyl chloride with vinyl acetate and containing approximately 87% by weight of vinyl chloride were combined on a differential roll mill with 1% by weight respectively of dibutyl tin maleate and dibutyl tin succinate. Each sample was milled for five minutes at 110° C. Thereafter discs were molded from these samples in identical molds at the same time, using a mold temperature of 150° C. which was applied for fifteen minutes. The disc containing dibutyl tin maleate was virtually colorless while that containing dibutyl tin succinate tended to be lemon-yellow in color.

Under the same conditions a sample of the same resin containing 1% by weight of di-(tributyl tin) maleate gave a product which was glass clear and colorless to visual observation.

*Example 7*

A conjoint polymer of vinyl chloride with vinyl acetate containing 87% vinyl chloride was intimately combined by milling with 1% by weight of dibutyl tin maleate and 0.01% by weight of cadmium laurate. A clear and transparent sheet was obtained which did not darken on heating for three hours at 135° C.

*Example 8*

The same resin as employed in the preceding example was thoroughly mixed by milling with 1% by weight of calcium ethylacetoacetate and 0.05% by weight of dibutyl tin maleate. The resulting composition did not discolor on heating for two to three hours at 135° C. Calcium ethylacetoacetate is described and claimed, either by itself or in conjunction with organo-metallic tin salts of carboxylic acids broadly, as a heat stabilizer for resins of this type in the copending application for W. M. Quattlebaum, Jr., and D. M. Young, Serial No. 350,084, filed August 2, 1940.

The quantity of the color reducing or color inhibiting substances may vary depending on the time of exposure to heat and on whether other basic stabilizers are present in the resin. Ordinarily this quantity ranges from 0.01% to about 5% by weight of the resin. Within this range approximately 1% to 2% is preferred.

This application is a continuation-in-part of the Quattlebaum and Noffsinger application Serial No. 350,085, filed August 2, 1940.

We claim:

1. A composition resistant to the discoloring effects of heat comprising a halogen-containing vinyl resin intimately combined with an organo-metallic tin salt of an alpha, beta-olefinic carboxylic acid.

2. A composition resistant to the discoloring effects of heat comprising a vinyl resin containing a vinyl halide polymerized therein intimately combined with an organo-metallic tin salt of an alpha, beta-olefinic carboxylic acid.

3. A composition resistant to deterioration on heating comprising a halogen-containing vinyl resin intimately combined with a basic substance capable of neutralizing hydrogen halides and with an organo-metallic tin salt of an alpha, beta-olefinic carboxylic acid.

4. A composition resistant to deterioration on heating comprising a vinyl resin containing a vinyl halide polymerized therein in admixture with a basic substance capable of neutralizing hydrogen halides and with an organo-metallic tin salt of an alpha, beta-olefinic carboxylic acid.

5. A composition resistant to the discoloring effects of heat comprising a vinyl resin containing a vinyl halide polymerized therein in admixture with a hydrocarbon tin salt of an alpha, beta-olefinic carboxylic acid.

6. A composition resistant to the discoloring effects of heat comprising a vinyl resin containing a vinyl halide polymerized therein in admixture with an alkyl tin salt of an alpha, beta-olefinic carboxylic acid.

7. A composition resistant to the discoloring effects of heat comprising a vinyl resin containing a vinyl halide polymerized therein in admixture with an aryl tin salt of an alpha, beta-olefinic carboxylic acid.

8. A composition resistant to discoloration on heating comprising a conjoint polymer of vinyl chloride with vinyl acetate in admixture with an organo-metallic tin salt of an alpha, beta-olefinic carboxylic acid.

9. A composition resistant to deterioration on heating comprising a conjoint polymer of vinyl chloride with vinyl acetate in admixture with a basic substance capable of neutralizing hydrogen chloride and a hydrocarbon tin salt of an alpha, beta-olefinic carboxylic acid.

10. A composition resistant to discoloration on heating comprising a conjoint polymer of vinyl chloride with vinyl acetate in admixture with an alkyl tin salt of an alpha, beta-olefinic dicarboxylic acid.

11. A composition resistant to discoloration on heating comprising a conjoint polymer of vinyl chloride with vinyl acetate in admixture with dibutyl tin maleate.

WILLIAM M. QUATTLEBAUM, Jr.
CHARLES A. NOFFSINGER.